(12) United States Patent
Schneider et al.

(10) Patent No.: US 7,280,906 B2
(45) Date of Patent: Oct. 9, 2007

(54) METHOD FOR DETECTING MISFIRES OF AN INTERNAL COMBUSTION ENGINE AND DEVICE FOR CARRYING OUT THE METHOD

(75) Inventors: Erich Schneider, Kirchheim (DE); Klaus Hirschmann, Schwieberdingen (DE); Manfred Hundhausen, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 10/988,363

(22) Filed: Nov. 12, 2004

(65) Prior Publication Data
US 2005/0145233 A1 Jul. 7, 2005

(30) Foreign Application Priority Data
Nov. 14, 2003 (DE) ................. 103 53 172
Jul. 24, 2004 (DE) ................. 10 2004 036 039

(51) Int. Cl.
*F02D 41/14* (2006.01)
*F02D 41/22* (2006.01)

(52) U.S. Cl. ............ 701/109; 123/690; 73/116

(58) Field of Classification Search ............ 701/108, 701/109, 111, 112, 113, 114; 73/116, 117.2, 73/118.1, 118.2; 60/276, 277, 278
See application file for complete search history.

(56) References Cited

U.S. PATENT DOCUMENTS

| | | | |
|---|---|---|---|
| 4,445,326 A | 5/1984 | Lyon | 60/274 |
| 5,069,035 A | 12/1991 | Kayanuma | 60/274 |
| 5,163,316 A | 11/1992 | Toyoda et al. | 73/117.3 |
| 5,168,859 A * | 12/1992 | Ohsaki | 123/679 |
| 5,426,934 A * | 6/1995 | Hunt et al. | 60/276 |
| 6,830,033 B2 * | 12/2004 | Boerkel | 123/406.47 |
| 7,031,828 B1 * | 4/2006 | Thompson et al. | 701/114 |

FOREIGN PATENT DOCUMENTS

| | | |
|---|---|---|
| EP | 793 803 | 9/1997 |
| JP | 62-228640 | 10/1987 |
| WO | WO 90/02874 * | 9/1988 |
| WO | WO 90/02874 | 3/1990 |

* cited by examiner

*Primary Examiner*—Stephen K. Cronin
*Assistant Examiner*—Johnny H. Hoang
(74) *Attorney, Agent, or Firm*—Kenyon & Kenyon LLP

(57) ABSTRACT

A method for detecting combustion misfires of an internal combustion engine and a device for carrying out the method, in which an evaluation of a lambda signal made available by at least one broadband lambda sensor is provided. The lambda signal is compared to a lambda signal threshold value. A warning signal is made available in response to the exceeding of a threshold in the direction of lean combustion. The procedure especially makes possible the detection of continual misfires which occur, for example, in response to an error in the air supply to the internal combustion engine and/or because of a lack of fuel. The procedure makes possible the detection of dangerous situations for at least one exhaust gas treatment device that is present, which may be removed by introducing protective measures, error warnings and error memory entries.

12 Claims, 2 Drawing Sheets

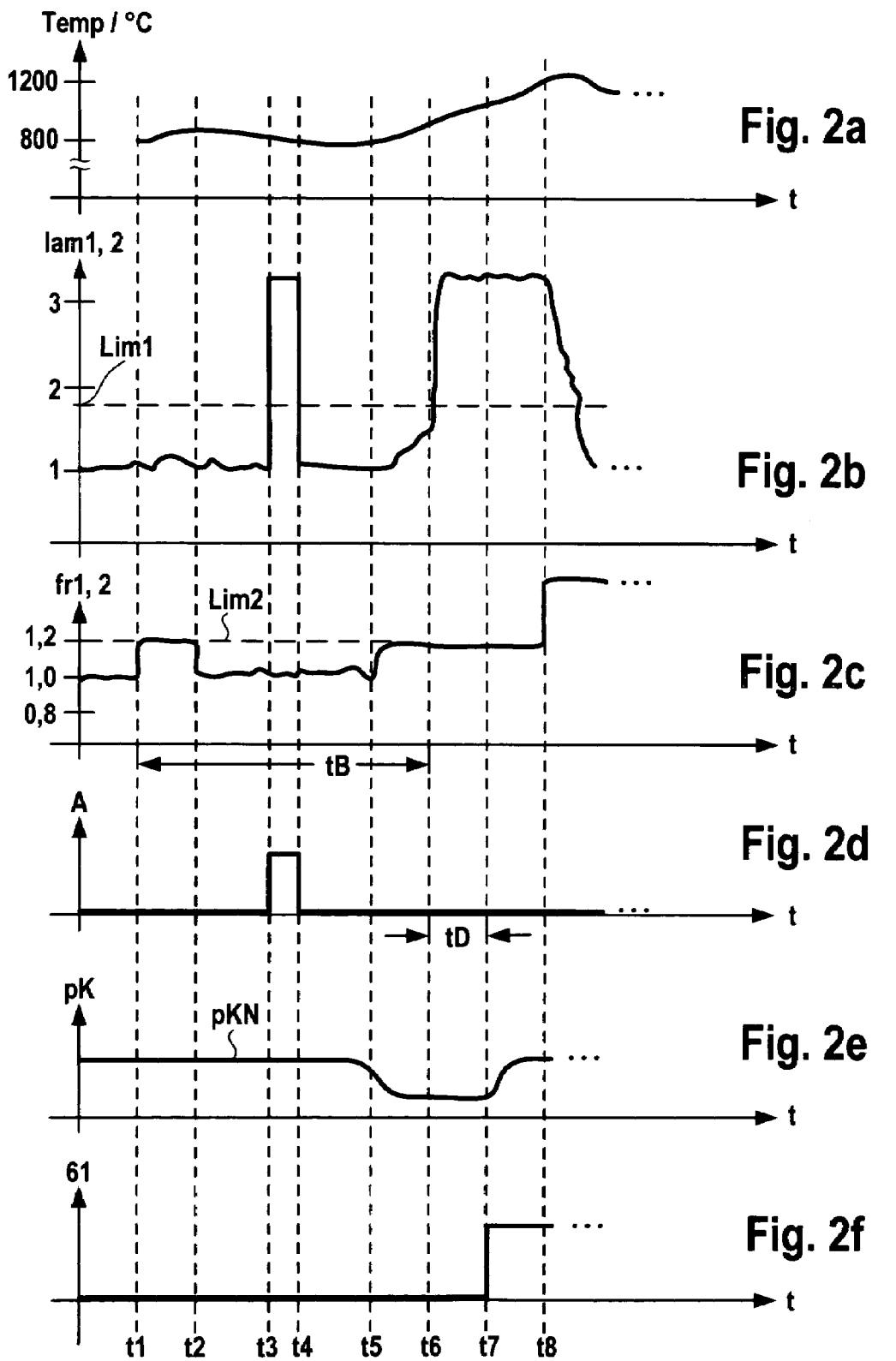

METHOD FOR DETECTING MISFIRES OF AN INTERNAL COMBUSTION ENGINE AND DEVICE FOR CARRYING OUT THE METHOD

BACKGROUND INFORMATION

A procedure is described, for example, in European Patent No. EP 793 803, in which a crankshaft angle range designated as a segment is assigned to each cylinder of the internal combustion engine. The segment time in which the crankshaft sweeps over this angle range depends, among other things, on the energy converted in the combustion cycle. Sporadic misfires lead to an increase in segment times registered synchronously with ignition. A misfire may prolong one or more segment times. A measure for the irregular operation of the internal combustion engine is calculated by a suitable determination of filter coefficients of a programmable digital filter, the filtering being able to extend over an angular range of up to four camshaft revolutions of the internal combustion engine.

In PCT Publication No. WO 90/02874 a procedure of this type is described in which a misfire is detected with the aid of a lambda signal made available by a lambda sensor. The lambda sensor has a great sensitivity with respect to lambda changes in range of a stoichiometric combustion. A misfire expresses itself by a change in the lambda signal, because of a short-range increase in the oxygen concentration in the exhaust gas connected with it. The misfire may be allocated to a specific cylinder by consideration of the gas running time from the cylinder to the lambda sensor.

Since a misfire leads to the appearance of uncombusted fuel in the exhaust duct of the internal combustion engine, an exhaust gas treatment device that is present there may be damaged by an inadmissibly high temperature increase which may appear within the scope of an exothermic reaction that may possibly be taking place. If misfires are detected, suitable measures may be taken up for protecting the exhaust gas treatment device from inadmissibly high temperatures. For example, the fuel supply to the affected cylinder may be eliminated. The appearance of sporadic misfires in a cylinder or a change in regular combustion processes and misfires leads to a detectable increase in irregular operation, so that the misfires are able to be detected using the known methods. An increased irregular operation does not, however, appear if the combustions misfire in all cylinders within a time that lies within the range of seconds. If, for example, the fuel pressure drops down to ten percent, an air ratio lambda of more than 3 may appear, at which combustion of fuel in an Otto internal combustion engine becomes impossible. Because of the heating energy contained in the uncombusted fuel, the temperature in a catalytic converter connected downstream from the internal combustion engine may increase in a few seconds from the operating temperature of, for example, 500° C. to 1300° C., for instance. At this temperature, a thermal destruction of the catalyst structure can no longer be excluded.

The present invention is based on the object of providing a method for detecting misfires of an internal combustion engine and a device for carrying out the method, which are especially conditioned on lack of fuel and/or on errors in the fuel supply of the internal combustion engine.

SUMMARY OF THE INVENTION

The procedure according to the present invention for detecting misfires of an internal combustion engine starts from an evaluation of a lambda signal made available by at least one broadband lambda sensor. The lambda signal is compared to a lambda signal threshold value which is specified within the range of a lean combustion at an air ratio of lambda greater than 1. If the lambda signal exceeds the lambda signal threshold value in the direction of lean combustion, a warning signal is made available.

The procedure according to the present invention makes possible the detection of a sequence of several misfires, which may appear especially because of too high an air proportion and/or too low a fuel proportion of the mixture before ignition. An endangering situation for the exhaust gas treatment device may be detected, which may be created by an input of uncombusted fuel which is able to be oxidized in a catalytic converter or a particulate filter. Because of the considerable heating value of the fuel, the temperature of the exhaust gas treatment device may rise to inadmissibly high values in response to the oxidation reaction which, at least if the reaction lasts for a while, may lead to the destruction of the exhaust gas treatment device.

The misfires may be caused by a lack of fuel. For example, there may be an error in the fuel supply. In the simplest case, the fluid level in a fuel tank has dropped to a level at which the fuel pump is no longer able reliably to aspirate the fuel. An error condition having several directly subsequent misfires instead of sporadic misfires is noticeable particularly in response to fuel supplies in which a return flow is being done without. In such a system the fuel pressure may sink to a low value, so that, to be sure, fuel is still being conveyed, but the rate of flow is not sufficient for keeping up an orderly combustion. If the fuel pressure falls, for example, to ten percent of the original value, this drop may lead to an air ratio lambda of greater than 3, at which combustion of the air/fuel mixture in an Otto internal combustion engine is no longer possible.

An additional cause for error may be an increased air supply. An undetected, increased air supply may occur if, for example, a crankcase breather hose falls off which connects the crankcase to at least one intake port of the internal combustion engine, the feed into the intake port lying downstream of the air sensor in the flow direction.

The procedure according to the present invention especially makes possible the detection of continual misfires, which represent an endangering situation for the exhaust gas treatment device because of uncombusted fuel proportions that are still present.

Suitable measures for protecting the exhaust gas treatment device may be undertaken by making available the warning signal.

One embodiment provides that the warning signal is made available if the lambda signal threshold value is exceeded for a specifiable time period. This measure may be designated as a first plausibility check of the warning signal. Only misfires present for a short period of time, which do not yet represent an endangering situation for the exhaust gas device, are able to be detected. In this situation, protective measures for the exhaust gas treatment device do not have to be undertaken. A design that may possibly be planned in addition provides checking the increase time of the lambda signal after the exceeding of a threshold. The warning signal is made available if the time of increase exceeds a specified threshold value.

An additional design, that may possibly be planned in addition, provides checking the gradient of the lambda signal after the exceeding of a threshold. The warning signal is made available if the gradient exceeds a specified threshold value. An undershooting corresponds to a slower increase than an exceeding. In practice, the gradient is ascertained from at least one difference quotient instead of the differential quotient.

One embodiment provides that, in specified operating situations of the internal combustion engine, the warning signal is not made available. Such an operating situation is, for instance, an overrun fuel cutoff, in which, because of the complete discontinuation of the fuel, the lambda signal exceeds the specified lambda signal threshold value within a short time.

One embodiment provides that the warning signal is made available if, when the threshold is exceeded, a lambda controller is working on an enrichment limit. A further embodiment, which may possibly be also provided, provides for making available the warning signal if, when the threshold is exceeded, the lambda controller, in a specified time period before the exceeding of the threshold, had already at least once worked on an enrichment limit.

One embodiment provides that an additional lambda signal of a lambda sensor that is preferably situated after the exhaust gas treatment device is taken into consideration. Using this measure, the functioning of the broadband lambda sensor, that is preferably situated upstream of the exhaust gas treatment device, may be checked. If the lambda signal made available by the broadband lambda sensor does not appear to be plausible, the warning signal is not made available.

One other embodiment provides that the enrichment limit of the lambda controller is increased, and that it is subsequently checked whether the lambda signal of the broadband lambda sensor returns to an admissible range. The warning signal is not made available if the return to the admissible range is possible. A constant lack of fuel and/or a constant interference in the air supply is unlikely under these circumstances.

An additional embodiment provides that, in an internal combustion engine having more than one bank of cylinders, the warning signal is made available if there is one exceeding of a threshold in at least two banks of cylinders.

Still another embodiment provides that the warning signal is only made available if, in addition, a fuel pressure signal made available by a fuel pressure sensor and/or a fluid level signal made available by a fuel fluid level sensor lies below a specified threshold value, respectively.

The warning signal made available is preferably deposited in an error memory. In order to warn a driver of a motor vehicle, corresponding information may be indicated (EPCL lamp, electronic power control lamp).

One particularly advantageous further development provides that, in case a warning signal has appeared, at least one measure is introduced to protect the exhaust gas treatment device against overheating. Such a measure is, for example, the suppression of a fuel injection signal and/or, for instance, the closing of a throttle valve situated in the intake port of the internal combustion engine.

The device according to the present invention for carrying out the method according to the present invention relates first to a control unit that is prepared for carrying out the method.

The control unit includes particularly a signal analysis for the signal made available by at least one lambda sensor.

The control unit preferably includes at least one electrical memory in which the method steps are stored as a computer program.

BRIEF DESCRIPTION OF THE DRAWINGS

FIGS. 2a-2f show signal curves as a function of time.

DETAILED DESCRIPTION

Figure 1:
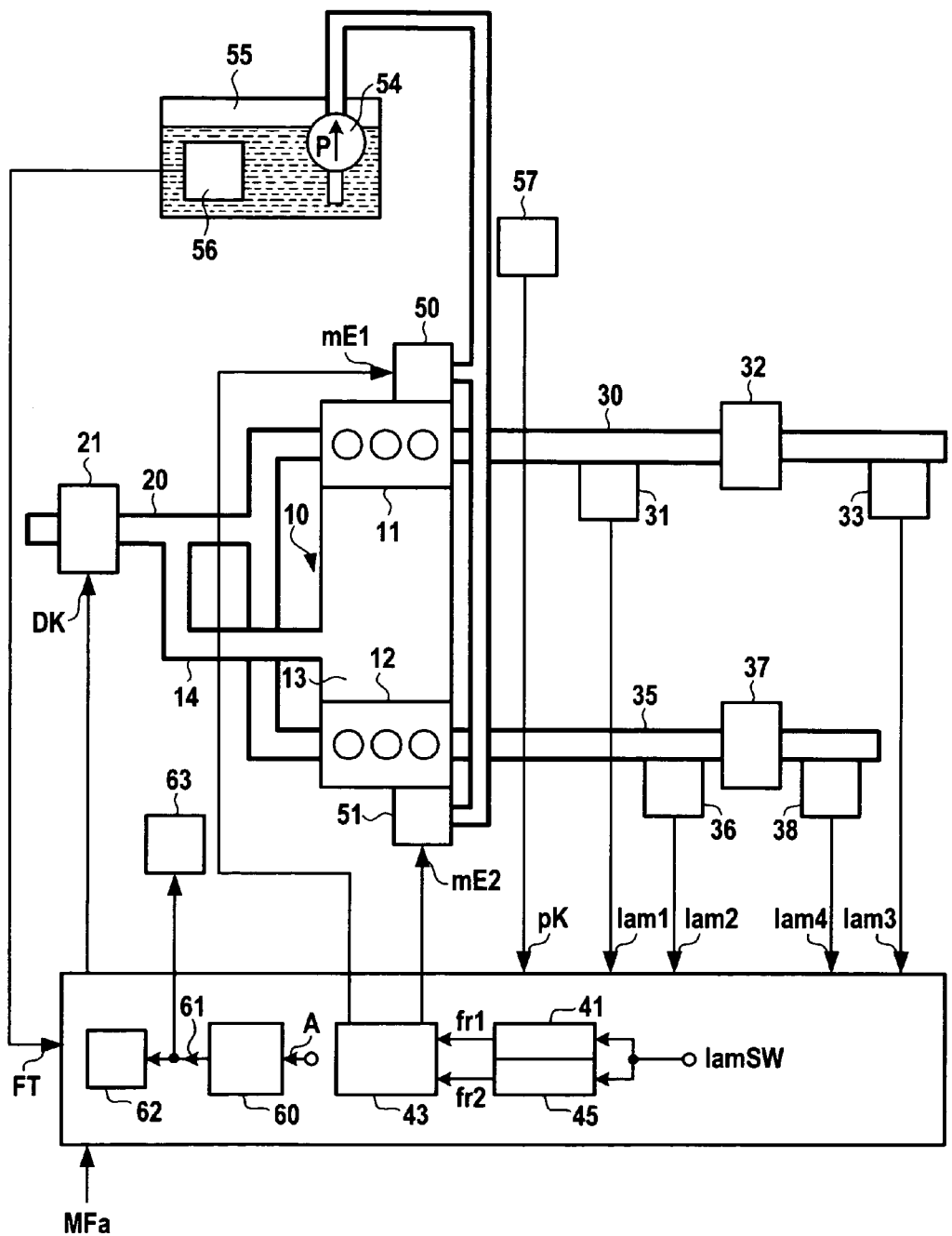
FIG. 1 shows a technical environment in which a method according to the present invention is running.

FIG. 1 shows an internal combustion engine 10, which has a first cylinder bank 11, a second cylinder bank 12 and a crankcase housing 13. Crankcase housing 13 is connected via a ventilation hose 14 to an intake port 20, in which is situated a throttle valve 21.

First cylinder bank 11 is connected to a first exhaust duct 30 in which there are situated a first broadband lambda sensor 31, a first exhaust gas treatment device 32, and a first abrupt change lambda sensor 33. Second cylinder bank 12 is connected to a second exhaust duct 35, in which there are situated a second broadband lambda sensor 36, a second exhaust gas treatment device 37, and a second abrupt change lambda sensor 38.

First broadband lambda sensor 31 passes to control system 40 a first lambda signal lam1, second broadband lambda sensor 36 passes to control system 40 a second lambda signal lam2, first abrupt change lambda sensor 33 a third lambda signal lam3, and second abrupt change lambda sensor 38 a fourth lambda signal lam4.

The first and third lambda signals lam1, lam3 are supplied to a first lambda controller 41, which, as a function of the comparison with a lambda setpoint value lamSW, makes available a first controlled variable fr1, which is supplied to a signal conditioning 43. The second and fourth lambda signals lam2, lam4 are supplied to a second lambda controller 45, which, as a function of the comparison with the lambda setpoint value lamSW, makes available a second controlled variable fr2, which is supplied to the signal conditioning 43.

Signal conditioning 43 makes available the first and the second fuel signal mE1, mE2. First fuel signal mE1 is made available to a first fuel metering device 50 and second fuel signal mE2 fuel signal mE1 is made available to a second fuel metering device 51.

The two fuel metering devices mE1, mE2 are connected to a fuel line 53 which is connected to a fuel pump 54. Fuel pump 54 is situated in a tank 55, whose fluid level is recorded by a fluid level sensor 56, which gives off a fluid level signal FT to control system 40. The fuel pressure present in fuel line 53 is recorded by a fuel pressure sensor 57, which makes available a fuel pressure signal pK to control system 40.

Control system 40 includes a signal analysis 60 which makes available a warning signal 61 that is supplied to both an error memory 62 and a display 63. Signal analysis 60 has a guard signal A supplied to it.

Control system 40 also has a torque setpoint signal MFa supplied to it and sends a throttle valve signal DK to throttle valve 21.

FIGS. 2a-2f show signal curves as a function of time.

FIG. 2a shows a temperature curve of first or second exhaust gas treatment device 32, 37. FIG. 2b shows the first or second lambda signal lam1, lam2. FIG. 2c shows the first or second controlled variable fr1, fr2. FIG. 2d shows a guard signal A. FIG. 2e shows the fuel pressure signal pK, and FIG. 2f shows warning signal 61.

In FIG. 2b a lambda signal threshold value Lim1 and in FIG. 2c an enrichment limit Lim2 of the first or second lambda controller 41, 45 are drawn in. Controlled variable fr1, fr2 first reaches enrichment limit Lim2 at a first point in time T1.

At second point in time T2 it leaves enrichment limit Lim2 again. Between a third and a fourth point in time T3, T4 guard signal A appears. Shortly before fifth point in time T5, fuel pressure signal pK falls off from a predefined fuel nominal value pKN to a lower value. At fifth point in time T5, first or second lambda signal lam1, lam2 rises slowly, and exceeds lambda signal threshold value Lim1 at sixth point in time T6. At seventh point in time T7, first or second lambda signal lam1, lam2 furthermore demonstrates a high level that lies above lambda signal threshold value Lim1. At an eighth point in time T8, enrichment limit Lim2 is raised to a higher value. Between first and fifth point in time T1, T5 there is a time range tB. Between sixth and seventh point in time T6, T7 there is a time duration tD.

The method according to the present invention for detecting misfires of internal combustion engine 10 works in the following manner:

Control system 40 determines first and second fuel signal mE1, mE2 and/or throttle valve signal DK as a function of torque setpoint value MFa, which is influenced, for instance, by an accelerator of a motor vehicle that is not shown in detail. First fuel signal mE1 determines the fuel quantity supplied to the cylinders of first cylinder bank 11 and second fuel signal mE2 determines the fuel quantity supplied to the cylinders of second cylinder bank 12.

The fuel is taken from tank 55, whose fluid level is recorded by fluid level sensor 56, and is made available to control system 40 using fluid level signal FT. Fuel pump 54 establishes specified fuel nominal pressure pKN in fuel line 53, which is able to be monitored by fuel pressure sensor 57, which makes available fuel pressure signal pK to control system 40.

In the following, at first reference is made only to components and signals that are assigned to first cylinder bank 11. The exhaust lambda is monitored with the aid of first lambda signal lam1 made available by first broadband lambda sensor 31. First lambda signal lam1 is a first input variable of first lambda controller 41, which compares first lambda signal lam1 to the specified lambda setpoint value lamSW, and ascertains first controlled variable fr1 as a function of the comparison.

Signal conditioning 60 includes, for example, correcting elements for influencing first controlled variable fr1. In addition, if appropriate, first fuel signal mE1 is formed from corrected controlled variable fr1, and it is conducted to first fuel metering device 50. First fuel signal mE1, for example, specifies the injection period of fuel injections into the cylinders of first cylinder bank 11.

The exhaust gas of first cylinder bank 11 is purified of undesired components in first exhaust gas treatment device 32. Exhaust gas treatment device 32 is, for instance, a catalytic converter and/or particulate filter. First abrupt change lambda sensor 33, which makes available third lambda signal lam3, is preferably situated downstream of exhaust gas treatment device 32. With the aid of third lambda signal lam3, one may increase the accuracy of a lambda control circuit which, as the lambda actual value detector, includes first broadband lambda sensor 31.

What is important to the execution of the method according to the present invention is the capability of a broadband lambda sensor to continually be able to measure a broad lambda range, such as 0.6-3.0. By contrast, an abrupt change lambda sensor makes available an abrupt change signal, using which the presence of a stoichiometric combustion is able to be recorded with great accuracy at an air ratio lambda of, for instance, 0.995 to 1.0.

According to FIG. 2a, first lambda signal lam1 is at least approximately 1, which corresponds to a stoichiometric combustion. After first point in time t1, no enleanment of the mixture occurs which is reflected by a measured increase of the quantity of the first lambda signal lam1 to greater than 1. At the same time, beginning at first point in time t1, the temperature of first exhaust gas treatment device 32 rises from an operating temperature of, for instance, 800° C. to, for instance, 850° C.

First lambda controller 41 reacts to the increase of first lambda signal lam1 using first controlled variable fr1, in order to enrich the mixture. First controlled variable fr1, which is, for instance, supposed to have the relative value 1, is increased, in the exemplary embodiment shown, up to enrichment limit Lim2, which is, for example, about 1.2. At second point in time t2, the disturbance has been corrected again. The temperature of first exhaust gas treatment device 32 drops off again to the operating temperature of, for instance, 800° C.

At third point t3 a predefined operating state of internal combustion engine 10 occurs, which is signaled using guard signal A. What is involved here is, for instance, an overrun operation of internal combustion engine 10, in which no more fuel is metered in. One immediate reaction is the increase of the oxygen proportion in the exhaust gas to large values, which is immediately reflected in lambda signal lam1. According to the exemplary embodiment, air ratio lambda rises to a value>3.

Signal analysis 60 evaluates first lambda signal lam1 first of all by a comparison to the predefined lambda signal threshold value Lim1, which, in the exemplary embodiment shown, is approximately 1.8. Lambda signal threshold value Lim1 is preferably fixed at a value at which the transition from a stable to an unstable combustion occurs. Preferably, lambda signal threshold value Lim1 is fixed to a value that is above the threshold at which, in an Otto internal combustion engine, combustion can no longer take place. At third point in time t3, first lambda signal lam1 exceeds lambda signal threshold value Lim1. Upon the exceeding of the threshold, warning signal 61 appears per se. The simultaneous presence of guard signal A, which is supplied to signal analysis 60, may be drawn upon so that warning signal 61 is not ascertained or is at least suppressed.

Shortly before fifth point in time t5, a pressure drop-off in the fuel pressure occurs, which is reflected in fuel pressure signal PK. As a result, first lambda signal lam1 rises slowly, until, at sixth point in time t6, it exceeds specified lambda signal threshold value Lim1. Since guard signal A is not present, warning signal 61 could already be made available at sixth point in time t6.

Preferably a plausibilization is undertaken. A first advantageous possibility provides the specification of time period tD, during which the exceeding of the threshold has to be present. Only after the expiration of time period tD at seventh point in time t7 is warning signal 61 made available. Alternatively, or possibly in addition, a change of lambda signal lam1 is checked after the exceeding of the threshold at sixth point in time t6. The time of the increase may be measured, for example. Alternatively or in addition, the gradient may be ascertained at which, in a practical implementation, at least one difference quotient is ascertained. Warning signal 61 is made available when the time of increase is slower than a threshold value or the gradient is smaller than a threshold value. A rapid increase would indicate a sporadic misfire or another mixture interference that is not supposed to lead to making available warning signal 61.

A plausibilization, which could possibly be provided in addition, provides the inclusion of first controlled variable fr1 of first lambda controller 41. It is checked whether first lambda controller 41 has worked at least once already at enrichment limit Lim2, within the preferably specified time range tB before the sixth point in time t6. In the exemplary embodiment shown, this was the case between the first and second point in time t1, t2, as well as beginning at fifth point in time t5. At fifth point in time t5, at the same time as the exceeding of the threshold, enrichment limit Lim2 is present.

An additional plausibilization, which may possibly be provided in addition, provides the inclusion third lambda signal lam3, that is made available by first abrupt change lambda sensor 33. The inclusion especially makes possible a plausibilization of first lambda signal lam1, made available by first broadband lambda sensor 31. The increase in first lambda signal lam1 after fifth point in time t5, which indicates lean combustion, must be reflected in a jump of third lambda signal lam3, it being necessary to take into consideration a running time of the exhaust gas through first exhaust gas treatment device 32 as well as an oxygen-storing capability of first exhaust gas treatment device 32.

Another plausibilization, which may possibly be additionally provided, provides the inclusion of more than one cylinder bank 11, 12 of internal combustion engine 10. An exceeding of a threshold must be present in more than one cylinder bank 11, 12. Warning signal 61 is only made available when this condition has been satisfied.

Another plausibilization, which may possibly be additionally provided, provides the inclusion of fuel pressure signal pK made available by fuel pressure sensor 57 and/or fluid level signal FT made available by fluid level sensor 56. Warning signal 61 is only made available if fuel pressure signal pK and/or fluid level signal FT are below specified threshold values, respectively. A further plausibilization, which could possibly be provided additionally, provides an increase in enrichment limit Lim2. The relevant increase is undertaken at the eighth point in time t8, in the exemplary embodiment. Subsequently to the increase in enrichment limit Lim2 of first and/or second lambda controller 41, 45 it is checked whether first or second lambda signal lam1, lam2 returns again to an admissible range. The admissible range may lie below the specified lambda signal threshold value Lim1. However, a higher value may also be specified. What is important here is that lambda signal lam1, lam2 falls off to lower values. In the exemplary embodiment shown, the condition is satisfied, because according to FIG. 2e the fuel pressure is supposed to rise again to fuel pressure nominal value pKN as of seventh point in time t7.

If protective measures had already been taken, these may be taken back. However, an input into error memory 62 should not be canceled. Display 62 activated by warning signal 61 should continue to indicate the warning statement, since a considerable endangerment potential for exhaust gas treatment device 32, 37 has occurred at least once.

According to one further improvement it may be provided that warning signal 61 is made available only if the exceeding of the threshold has occurred a predefined number of times.

Shortly after fifth point in time t5, the temperature of exhaust gas treatment device 32, 37 may rise. Making available warning signal 61 at sixth point in time t6 or, at the latest, at seventh point in time t7, makes possible the introduction of measures for protecting exhaust gas treatment device 32, 37. It may, for example, be provided that fuel signal mE1, mE2 be suppressed, so that no more fuel is supplied to the cylinders of internal combustion engine 10. Alternatively or supplementarily, it may be provided that throttle valve 21 is closed. The measures to be introduced have as their aim either to reduce the fuel proportion or the oxygen proportion appearing in exhaust duct 30, 35 in order to prevent an exothermic reaction, or to get a reaction that has already started to die down.

What is claimed is:

1. A method for detecting combustion misfires in an internal combustion engine, in which a lambda signal made available by at least one lambda sensor is evaluated, the method comprising:
   providing a broadband lambda sensor as the lambda sensor;
   comparing the lambda signal made available by the broadband lambda sensor to a lambda signal threshold value;
   specifying the lambda signal threshold value at an air ratio lambda greater than 1 in a range of lean combustion; and
   making available a warning signal in response to an exceeding of the lambda signal threshold value in a direction of lean combustion, wherein the warning signal is made available if an enrichment limit of a lambda controller is increased, and if, thereupon, the lambda signal returns to an admissible range.

2. The method according to claim 1, wherein the warning signal is made available if at least one of (a) the lambda signal threshold value is exceeded for a specified time period and (b) at least one of an increase time and a gradient of the lambda signal, after the exceeding of the lambda signal threshold value, undershoots a specified threshold value.

3. The method according to claim 1, further comprising at least one of suppressing and not ascertaining the warning signal in specified operating situations of the engine.

4. The method according to claim 1, wherein the warning signal is made available if a lambda controller, in response to an exceeding of the lambda signal threshold value in a specified time range before the exceeding of the threshold value or at a point in time of the exceeding of the threshold value, has worked at least once on an enrichment limit.

5. The method according to claim 1, wherein the warning signal is made available if an additional lambda signal of at least one abrupt change lambda sensor confirms the lambda signal of the broadband lambda sensor.

6. The method according to claim 1, wherein the engine has at least two cylinder banks, and wherein the warning signal is made available if the exceeding of a threshold is present at at least two of the cylinder banks.

7. The method according to claim 1, wherein the warning signal is made available if at least one of (a) a fuel pressure signal made available by a fuel pressure sensor and (b) a fluid level signal made available by a fuel fluid level sensor lies below a threshold value.

8. The method according to claim 1, further comprising depositing the warning signal in an error memory.

9. The method according to claim 1, further comprising indicating the warning signal on a display.

10. The method according to claim 1, further comprising, in the warning signal that is made available, introducing at least one measure for protecting an exhaust gas treatment device from overheating, which reduces at least one of a fuel proportion and an oxygen proportion in an exhaust gas of the engine.

11. A device for operating an internal combustion engine comprising:
   at least one control unit for detecting combustion misfires in the engine, in which a lambda signal made available by at least one broadband lambda sensor is evaluated, the at least one control unit being adapted to perform the following:

comparing the lambda signal made available by the broadband lambda sensor to a lambda signal threshold value;

specifying the lambda signal threshold value at an air ratio lambda greater than 1 in a range of lean combustion; and making available a warning signal in response to an exceeding of the lambda signal threshold value in a direction of lean combustion, wherein the warning signal is made available if an enrichment limit of a lambda controller is increased, and if, thereupon, the lambda signal returns to an admissible range.

12. The device according to claim 11, wherein the control unit includes a signal analyzer for evaluating the lambda signal of the at least one lambda sensor.

* * * * *